March 7, 1961 C. F. BOE 2,973,783
STRUCTURAL FORM PRODUCTION METHOD AND APPARATUS
Filed June 6, 1957 5 Sheets-Sheet 3

INVENTOR
Carsten F. Boe
BY Connolly and Hutz
ATTORNEYS

United States Patent Office 2,973,783
Patented Mar. 7, 1961

2,973,783

STRUCTURAL FORM PRODUCTION METHOD AND APPARATUS

Carsten F. Boe, Malvern, Pa.
(Kelsey Hill Road, Deep River, Conn.)

Filed June 6, 1957, Ser. No. 664,088

26 Claims. (Cl. 138—55)

This invention relates to a novel extruded structure having unusual strength for resisting oriented forces, and more particularly to a novel method, and apparatus, for extruding this structure in tubular form.

The use of fibers to reinforce plastics is well known at present. However, when these fibers are merely arranged at random, the resultant structure is not particularly capable of resisting oriented forces, such as the severe hoop stress which occurs in the walls of a pipe under internal pressure. To withstand these highly oriented stresses, tubes have been built up of long continuous thread helically wound in layers and held together by a plastic binding material. If these threads are only wound in one direction, they tend to unwind under stress. Even when they are wound in opposite directions in alternate layers, these layers tend to separate from each other under stress rather than acting together as a unit to resist the stress.

In the manufacture of edible tubing made of animal fibrous masses, sausage skins for example, attempts have been made to somewhat influence orientation of the fibers by extrusion through an annular orifice including rotating elements. These rotating orifices, however, only superficially affect fiber orientation. This superficiality has prevented either the conception or production of a novel fiber orientation which unexpectedly resists oriented forces of considerable magnitude. Examples of these sausage casings and production methods are described for example in Becker Patent Nos. 2,046,541, 2,115,607, 2,161,908, 2,263,292, 2,246,236, 2,345,086, 2,676,356 and 2,714,744.

An object of this invention is to provide a fiber reinforced extruded structure which has unusual strength to resist oriented forces of considerable magnitude;

Another object is to provide a simple method of fabricating the aforementioned structure;

A further object is to provide a simple, dependable, and economical apparatus for practicing the aforementioned method.

BRIEF SUMMARY

In accordance with this invention, a structural material is extruded in tubular form and includes fibers interspersed within a matrix of binding material. These fibers are angularly oriented in substantially equal and opposite angles to the principal direction of extrusion in outer regions of said tubular form with a gradual transition from one angular orientation to the other through the interior of the tube wall where the fibers may be substantially oriented in the principal direction of extrusion.

These fibers may be molecular chains of the plastic substance which also forms the binding material, or the fibers may be a material different in composition from the binding material and which has a tensile strength relatively greater than the tensile strength of the binding material.

The binding material may be a thermoplastic material particularly where molecular chains are employed as fibers or it may be a thermosetting material. An adhesion promoter may be effectively utilized to firmly bind the fibers and fillers within the hardening plastic material where fibers and binders of different composition are used.

This novel structural material is extruded in tubular form in accordance with the following novel extrusion process. A tubular mass of plastic material in a flowable condition is longitudinally fed and then influenced to rapidly set to form a rigid tubular structure. This plastic material may include interspersed fibers or it may be susceptible of formation into linear molecular chains. Counter-rotating forces are exerted in peripheral directions relative to the rigid extruded form respectively from the inside and outside regions into the interior of the walls of the tubular mass immediately before it sets into rigidity. These forces in conjunction with the anchoring effect of the extruded rigid form react upon the mass to divert its outer regions into substantially equal and opposite angles to the principal direction of extrusion of the rigid form. This produces and preserves the aforementioned advantageous fiber orientation. Tensional forces may be exerted upon the mass as it is in the process of orientation to help provide the orientation by exerting a pull on the rigid form in the direction of extrusion.

One means of influencing the immediate setting of the extruded tubular form is to use a thermoplastic composition and suddenly cool it. A thermosetting material may be influenced to set substantially immediately into a rigid structure by various methods. It may be heated before, during, and/or after application of the counter-rotating forces to cross link it immediately after extrusion. It also may be extruded at temperatures below its permanent setting temperature and be influenced to congeal by cooling. The congealed structure may then be permanently cross linked, for example, by age hardening at ordinary temperatures or by heating at gradually rising temperatures just below the correspondingly rising softening temperatures.

Tensional forces may be applied to the extruded form as it is congealing in the unique orientation of this invention to help promote alignment of all of the individual fibers. This type of aligning force is most effective when applied to linear molecular chain materials.

A novel apparatus for carrying out the aforementioned novel extrusion process or method includes an annular channel with force-applying elements adjacent its inner and outer surfaces. These elements are formed in a manner to permit the counter-rotating forces produced thereby to gradually diminish and cancel towards the interior of the tube wall. These elements may, for example, be counter-rotating vanes. Their counter-rotation may be produced by equal and opposite rotation of the inner and outer elements or it may be produced by rotation of one element and rotation of the extruded tube in the same direction at one-half the speed of the rotating element.

The counter-rotating mass is either discharged immediately after its passage through the counter-rotating elements to set into a rigid structure, or its inner and outer surfaces, helically grooved by the direction of flow during transition from counter rotation to a rigid structure may be smoothed and compacted in cross section by a short transitional travel through counter-rotating smooth orifice-like extensions of the vaned elements. The length of travel through these orifice-like extension, however, must be short enough to prevent interference with a smooth helical transition from the counter rotation to rigidity. Heat exchange means are provided at the exit from these counter-rotating elements to influence the setting of the extruded form into a rigid structure. This heat exchange means may abstract or add heat in accordance with the characteristics of the extruded composition.

Tensional forces may be applied to the congealing extruded form, for example, by means of a capstan and extensions of the counter rotation elements which frictionally restrain the congealing extruded form.

The novel structure which is a product of the aforementioned unique extrusion process and apparatus is capable of withstanding oriented forces of considerable magnitude, for example, extremely high stresses in various directions. A tube formed in accordance with this invention, for example, can withstand internal pressures substantially greater than heretofore known tubes of the same size with fibers in random orientation. Increases in strength in the order of 50% to 100% have been thereby achieved.

The product of this invention may be achieved by utilizing a wide variety of compositions. The general requirement of a usable composition is that it be susceptible of passage through the counter-rotating force-applying elements in a plastic condition, be capable of being influenced to substantially immediately set or become rigid after discharge from these elements, and either include interspersed fibers or inherently be susceptible to internal formation of linear molecular chains. When a composition of this type is worked upon in accordance with the novel method and apparatus set forth herein, an extruded tubular structure is provided having the advantageous fiber orientation previously described which has unexpectedly great ability to resist oriented forces such as the hoop stress produced by internal pressures.

Novel features and advantages of the present invention will become apparent to one skilled in the art from a reading of the following description in conjunction with the accompanying drawings wherein similar reference characters refer to similar parts and in which.

PRODUCTS

Figures 1, 2:
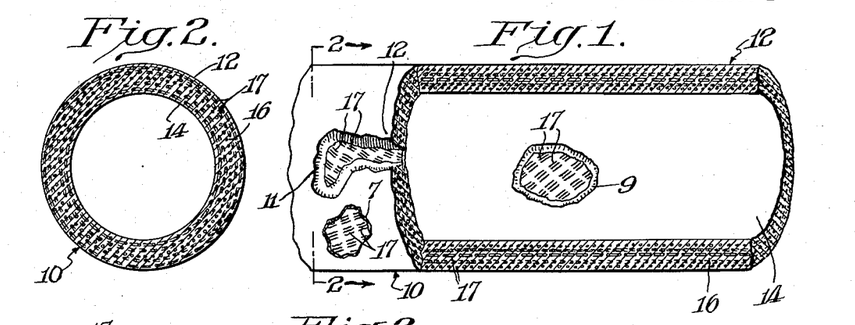
Fig. 1 is a perspective diagrammatic or pictorial illustration partially broken away and partially in cross section of an embodiment of this invention.
Fig. 2 is a cross-sectional view taken through Fig. 1 along the line 2—2 and looking in the direction of the arrows.

Figs. 1–4 illustrate the novel fiber orientation of this invention. In Fig. 1 is shown a tubular structure 10 which has been partially cut in half and scraped to form gouged depressions 7, 9, and 11 to respectively illustrate the fiber orientation adjacent its outer surface 12, its inner surface 14, and the interior region 16. As shown in Fig. 1, the fibers 17 in the outer regions respectively adjacent the outside surface 12 and the inside surface 14 are angularly or more specifically helically oriented in substantially equal and opposite directions. A gradual transition from one angular orientation to the other through the interior 16, where the fibers 17 are substantially oriented in the longitudinal or principal extrusion direction, is indicated by the angular directions assumed by the fibers 17 within gouged depression 11 and near and on the surfaces 12 and 14 and by the fiber silhouettes revealed along the cut edges of tube 10. This orientation is further illustrated by the fiber arrangement shown in Fig. 2 where the fibers 17 within the interior 16 are shown head-on and the fibers in the outre regions 12 and 14 are shown in relatively greater projected lengths as their angular orientation increases toward the surfaces.

Figure 3:
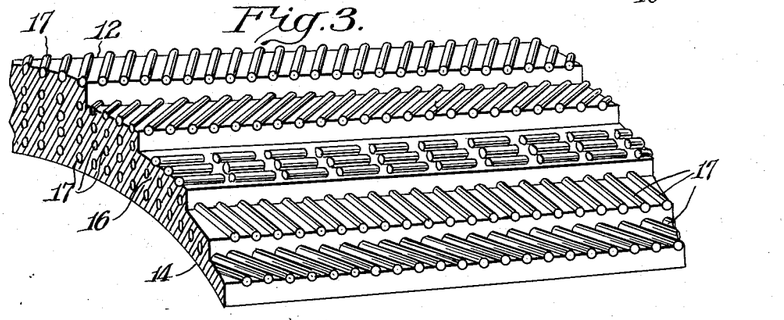
Fig. 3 is another perspective diagrammatic or pictorial illustration of a greatly enlarged portion of the embodiment shown in Fig. 1.
Figure 4:
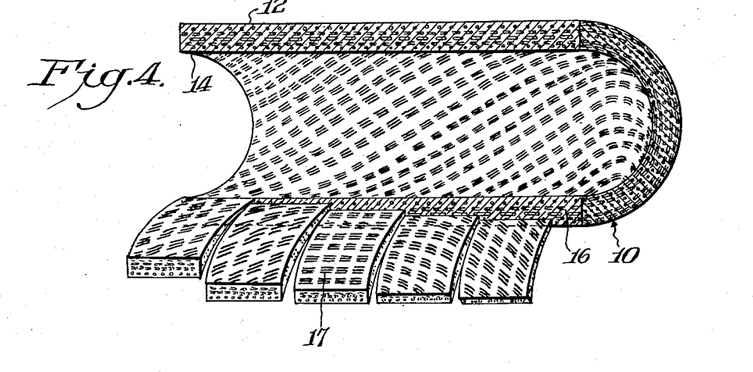
Fig. 4 is still another perspective diagrammatic or pictorial illustration partially broken away and partially in cross section showing representative slices cut at various depths through the wall of the embodiment shown in Fig. 1.

This novel orientation is further illustrated by the perspective enlarged schematic illustration shown in Fig. 3. The steps represent layers cut out of the tube wall and not laminations. This gradual transition permits the entire wall to cooperate in withstanding severe directional stresses such as those set up, for example, by internal pressures, in a pipe. The slivers in Fig. 4 peeled from the tube wall at various depths further illustrate this gradual transition which is provided without the presence of any discrete individual layers.

USES

The product of this invention may be advantageously used in the tubular form herein illustrated or these tubes may be slit and flattened into structural sheets. These sheets may be utilized in either single or multiple ply forms to provide structural forms having unique properties. Some of these unique structural forms are described and claimed in copending application S.N. 500,702, filed April 11, 1955, of which this application is in part a continuation-in-part. This present application is also a continuation-in-part of applicant's copending applications as follows: S.N. 464,604 filed Oct. 20, 1954; S.N. 468,835 filed Nov. 15, 1954; and S.N. 470,300 filed Nov. 22, 1954. All four of the foregoing applications have been abandoned.

PRODUCTION METHOD AND APPARATUS

The fabrication of the aforementioned product is accomplished by means of novel apparatus shown in Figs. 5–9, which carries out the steps of a similarly novel process or method. This extrusion apparatus 20 includes a feeding or supplying means 22, and a counter-rotating force-applying means 24. The feeding or supplying means 22 is, for example, a screw type conveyor 26 similar to that used in conventional thermoplastic extrusion. It is disposed, for example, at an angle of approximately 45° to an annular chamber 28 leading to counter-rotating force-applying means 24.

Counter-rotating force-applying means 24 is provided, for example, by a pair of nested counter-rotating vaned or pocketed elements 30 and 32 which form between them an annular channel 34 through which the composition passes longitudinally as it is diverted along its inner and outer surfaces in equal and opposite directions by the pockets 36 and 38 respectively formed within vaned elements 30 and 32.

Figure 5:
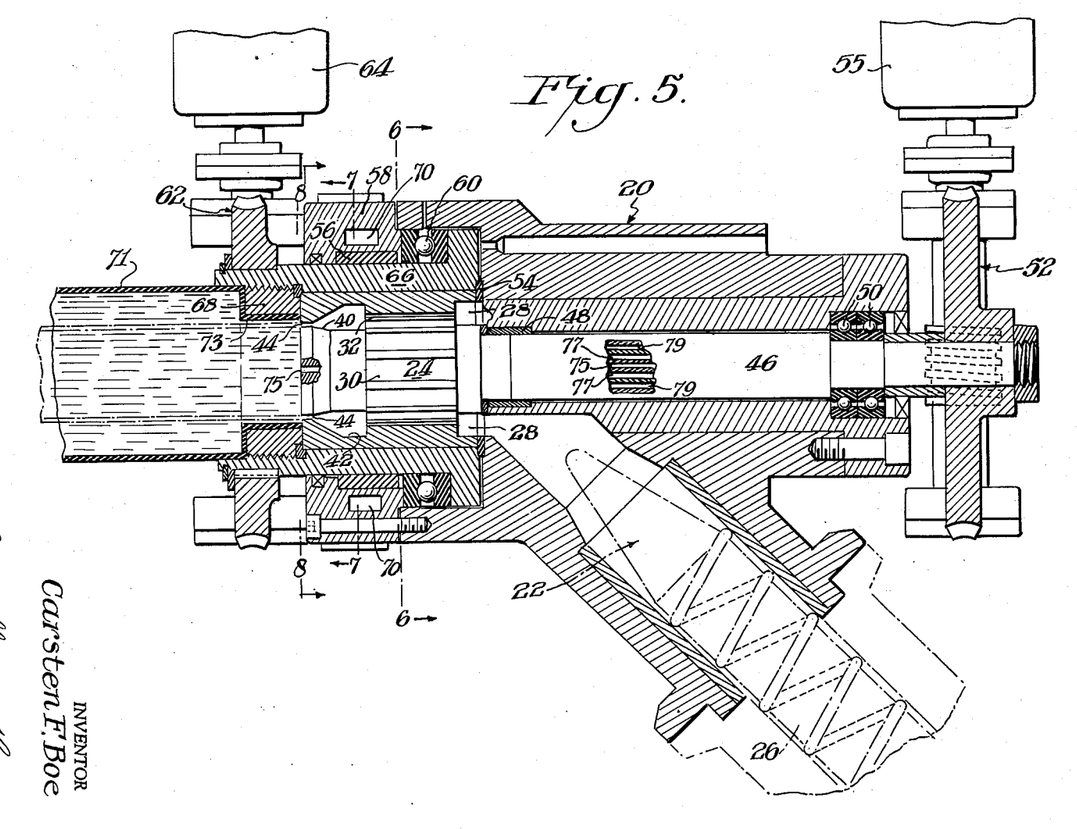
Fig. 5 is a cross-sectional view in elevation of apparatus which is another embodiment of this invention.
Figure 6:
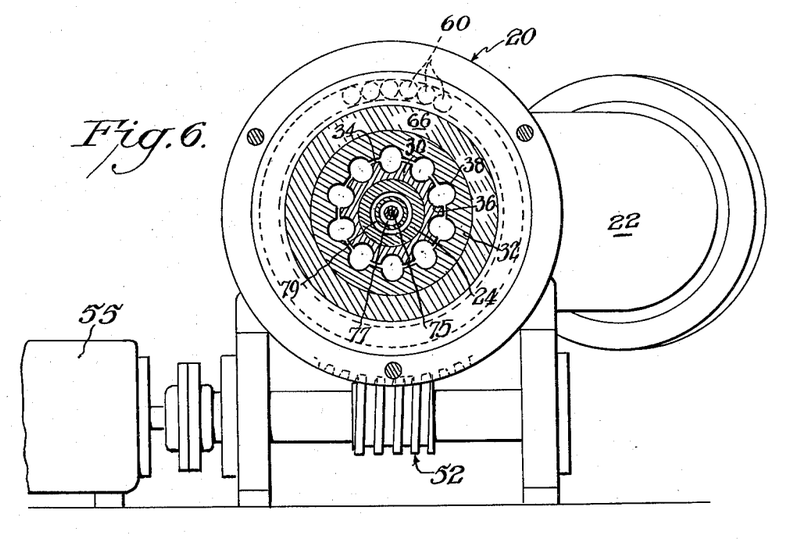
Figs. 6–8 are respectively cross-sectional views taken through Fig. 5 along the lines 6–6, 7–7, and 8–8, and looking in the direction of the arrows.
Figures 7, 8:
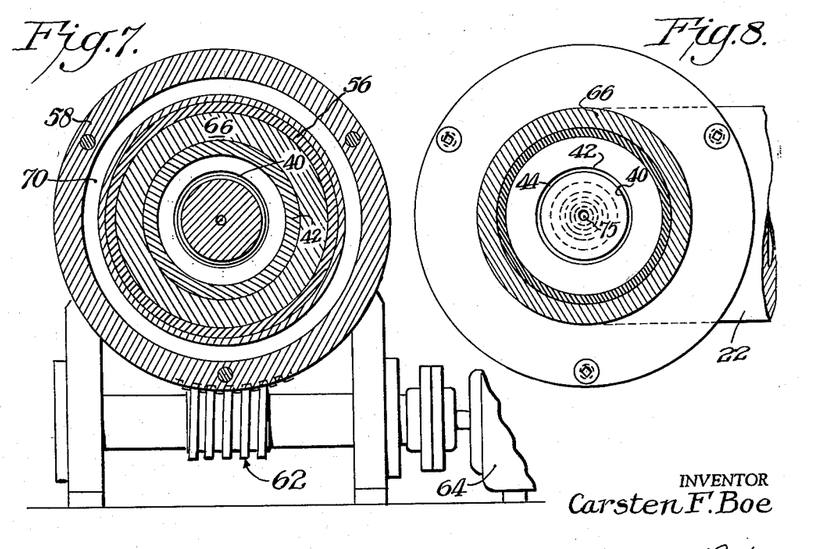

When the extrusion composition is supplied by conveyor 26 at a proper rate of speed and vaned elements 30 and 32 are rotated in opposite directions at substantially equal speeds, a product having the aforementioned novel and advantageous fiber orientation is produced directly at the exit from elements 30 and 32. The inner and outer surfaces of this directly extruded tube, however, would be deeply scored by the impressions of these pockets, but might be suitable for use where this rough surface condition might be unobjectionable or even advantageous such as for use in heat exchange equipment.

Where smooth inner and outer tubular surfaces, however, are desired, smooth continuations 40 and 42 of elements 30 and 32 respectively are provided to guide and shape the extruded tubular structure which exits from between the vaned elements 30 and 32 into a relatively smooth tube. Continuations 40 and 42 may, for example, initiate from the roots of pockets 36 and 38 of elements 30 and 32 respectively and taper gradually toward each other to form a relatively narrow annular exit throat 44 from which the extruded tube issues in a smooth compact form having the desired fiber orientation.

Internal vaned element 30 is, for example, a continuation of a shaft 46 rigidly supported within a sleeve bearing 48 and a ball bearing 50, for example. Shaft 46 is rotated by means of a gear transmission 52 and an electric drive motor 55, for example. Transmisison 52 is a worm and pinion gear drive, for example. Suitable packing glands 54 of Teflon, for example, are provided between chamber 28 and bearing 48 for shaft 46 to prevent leakage of the extrusion composition into the bearing.

Outer rotating element 32 and its continuation 42 are supported within a sleeve bearing 56 mounted within housing 58. Thrust between rotating element 32, its continuation 42, and housing 58 is absorbed by means of a ball bearing 60. Element 32 and its attached surrounding sleeve 42 are rotated by means of a worm and pinion gear transmission 62 and an electric motor 64, for example. Element 32 and its sleeve 42 are, for example, secured within a larger flanged sleeve 66 by means of a threaded collar 68.

Passages 70 are provided in housing 58 to conduct a heat exchange fluid for providing optimum conditions during extrusion. A fluid, either hot or cold, relative to the extruded mixture may be conducted through passages 70 in accordance with setting characteristics of the plastic composition.

Heat exchange means for influencing substantially immediate setting of the extruded tubular form is provided, for example, by means of a cylindrical chamber 71 secured to the outer rotating sleeve 66. A separating band of insulating material 73 divides the interior of chamber 71 from sleeve 66. Chamber 71, for example, is filled with a cooling fluid such as water, for example, into which an extruded thermoplastic tubular form, for example, is plunged immediately after it emerges from orifice 44. This tends to immediately harden the tubular mass into a rigid structure. An auxiliary water supply conduit 75 extends through the extruding end of shaft 46 to pump cold water through the interior of the extruded tube 10 to cool and harden its interior at a rate equal to the rate of cooling and setting of the exterior.

Another separate heat exchange fluid such as water at a warmer temperature, for example, is piped through the hollow interior of shaft 46 through concentric passages 77 and 79, for example, which surround water supply conduit 75. The temperature of the heat exchange fluid pumped through passages 77 and 79 is regulated to provide optimum extrusion and setting characteristics in accordance with the characteristics of the particular composition that is being extruded.

When a thermosetting composition, for example, is extruded, a hot fluid, hot water for example, fills chamber 71, and relatively cooler fluid is pumped through concentric pipes 77 and 79.

In the form of this apparatus shown in Figs. 5–9, it is intended that the counter-rotating force-applying vaned elements and continuations thereof be rotated at substantial and equal speeds. But variations from this theoretical condition are contemplated where advantageous control of the fiber orientation of the extruded product are desired. However, one of these elements may be mounted stationary or rotated at a relatively fast speed if the extruded tube itself is grasped after setting and rotated in the same direction as that of the rotating element and approximately at one-half of its rotational speed.

In Figs. 11–14 is shown a modification of the apparatus shown in Figs. 5–9 which includes a slightly different form of heat exchange means disposed at the exit from the counter-rotating elements. Also, a means for exerting a pull upon the rigid form in the direction of extrusion is incorporated in the illustrated apparatus to help provide the unique fiber orientation of this invention.

Figure 11:
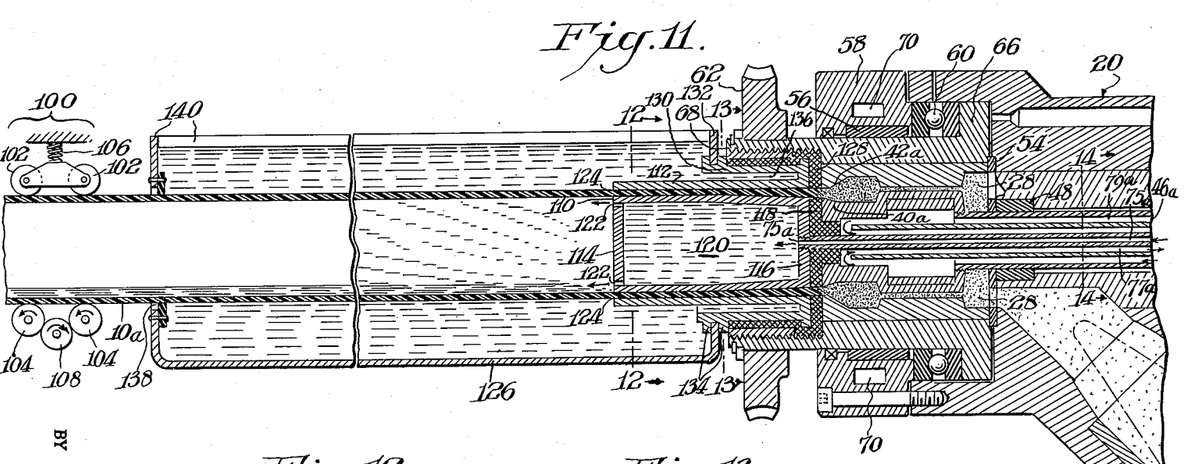
Fig. 11 is a cross-sectional view in elevation of a further embodiment of this invention.
Figure 12:
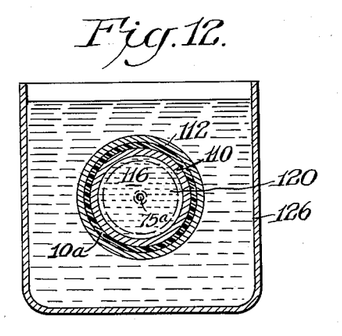
Figs. 12–14 are respectively cross-sectional views taken through Fig. 11 along the lines 12–12, 13–13, and 14–14, and looking in the direction of the arrows.
Figure 13:
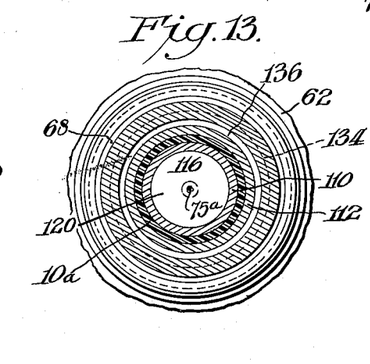

Referring to Figs. 11–13, a pull exerting means 100, a capstan for example, is operatively engaged with the extruded rigid tubular form 10a to exert the aforementioned pull in the direction of and during extrusion. Capstan 100 includes, for example, opposed sets of frictional rollers 102 and 104, made for example of rubber. Rollers 102, for example, are idlers which are maintained in resilient contact with the surface of tubular form 10a by means of a spring mounting 106. Rollers 104 are positively driven in the indicated direction, for example, by a driving roller or disc 108 maintained in frictional contact with them. Driving roller 108 is driven, for example, by a variable speed drive which causes a pull to be exerted upon the tubular form sufficient to overcome any drag imposed upon it after it leaves the counter-rotating fiber-orienting elements.

This drag, for example, is exerted by heat exchanging extensions 110 and 112 attached to counter-rotating elements 40a and 42a respectively. Inner extension 110, for example, is a hollow cylindrical member. Its end wall 116 adjacent element 40a is thermally insulated therefrom by means of a gasket 118 made, for example, of Teflon, a tetrafluoroethylene polymer made by the du Pont Company. Inner extension 114 has a hollow interior 120 through which a heat exchange fluid, water for example, is pumped to influence the extruded fiber-oriented form to substantially immediately become rigid. Fluid is provided to chamber 120 by means of supply pipe 75a and is discharged through a pair of orifices 122.

Outer extension 112 of counter-rotating element 42a has a inside diameter which substantially corresponds to inside diameter of element 42a, and it is disposed parallel to the inner extension 110 to provide an annular space 124 of gradually diminishing cross section from entrance to exit. Both extensions 110 and 112 are made of a substantially effective heat exchange material such as steel, for example.

A supply of a heat exchange fluid, water for example, is contacted with outer extension 112 by, for example, immersing it entirely within the tank 126 of water. Extension 112 is insulated from counter-rotating element 42a by means of a Teflon gasket 128. The outer circumferential wall of a collar 130 surrounding and joined to extension 112 passes through the side wall 132 of tank 126.

A rotating seal 134 of conventional construction, for example, is provided between wall 132 and collar 130 to prevent leakage of fluid from the tank. An annular space 136 is provided between collar 130 and extension 112 to enable the heat exchange fluid to contact substantially all parts of extension 112 lying adjacent extruded tubular form 10a. A gland 138 is provided in the wall 140 of tank 126 through which tubular form 10a moves in the direction of its extrusion to prevent leakage of fluid about the outside surface of the tube.

Figure 14:
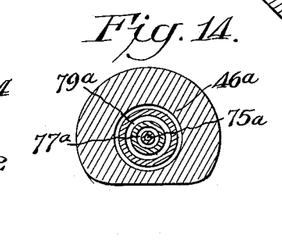

The heat exchange fluid in tank 126 may, for example, be cold water when a thermoplastic composition is being extruded. Hot water, for example, may be used where a thermosetting composition is utilized. Other types of heat exchange means of course may be utilized, such as mechanical refrigeration or dielectric heating. Concentric heat exchange passages 75a, 77a and 79a extend through shaft 46a and the counter-rotating elements as shown in Figs. 11 and 14 to maintain optimum flow characteristics in the composition being oriented.

Annular space 124 is tapered to produce a gradual reduction in cross section towards its exit. This produces a drag on the extruded form which balances the pull of capstan 100. This drag cooperates with the pull of the capstan to exert a tensional force on the oriented material as it is freezing into shape. This tensional force helps produce and maintain the advantageous fiber orientation of this invention. The drag may be limited, for example, by lining the tubular form contacting surfaces of extensions 110 and 112 with a self-lubricating material, for example, Teflon. This prevents adhesion of the extruded tubular form with these contacting surfaces which, for example, might occur when a thermosetting material is being hardened by application of heat directly within extensions 110 and 112, for example, by means of dielectric heating.

FABRICATION METHOD

Figure 9:
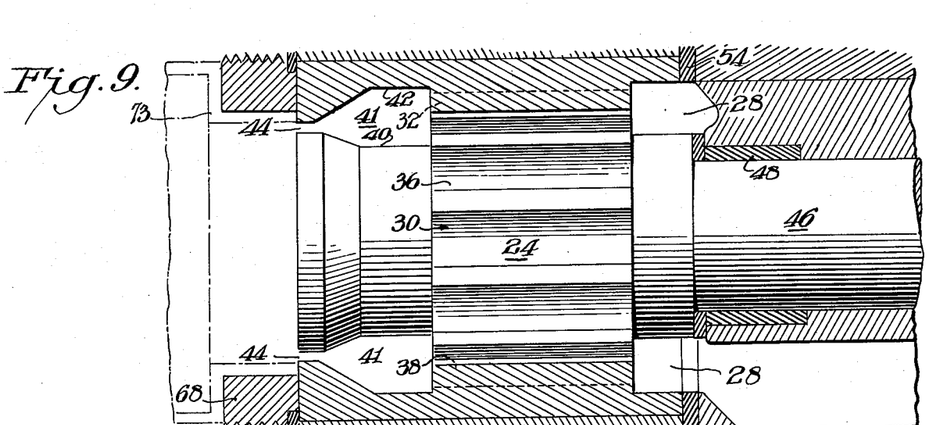
Fig. 9 is an enlarged cross-sectional view of a portion of the apparatus shown in Fig. 5.
Figure 10:
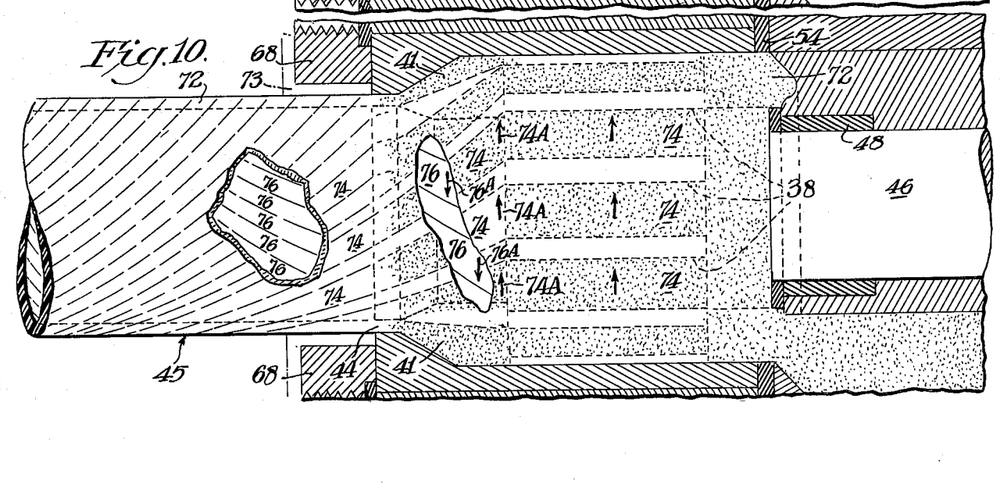
Fig. 10 is a schematic representation of the practice of a process or method which is still another embodiment of this invention.

As schematically shown in Fig. 9 in alignment with pertinent portions of the apparatus shown in Fig. 10, a tubular mass 72 of plastic material including interspersed fibers or of a composition susceptible of formation into linear molecular chains is fed through chamber 28 into counter-rotating force-applying means 24 comprised of counter-rotating vaned or pocketed elements 30 and 32. The composition 74 within the pockets 38 of outer element 32 is grasped and rotated in the direction of arrows 74A while the composition 76 in the pockets 36 of the inner element 30 (not shown) is rotated in the opposite direction in the direction of arrows 76A. The composition leaves the pockets and discharges into compacting or smoothing chamber 41 formed between the smooth counter-rotating continuations 40 and 42 of vaned elements 30 and 32 respectively. Continuations 40 and 42 converge to discharge a smooth tube 45 from throat 44 which is influenced to substantially immediately set or freeze into a substantially rigid structure. The reaction between the anchoring effect of the rigid structure and the counter-rotating form which is applied to the material in the transition zone within chamber 41, orifice 44 and a very short distance thereafter orients the composition and fibers in the helical manner, which is illustrated by the positions of outer bands 74 and inner bands 76 within chamber 41 as shown in Fig. 10. Arrows 74A and 76A respectively indicate the directions in which the portions of bands 74 and 76 adjacent vaned elements 32 and 30 are moving relative to each other and relative to the structure previously frozen in unique orientation in tube 45.

To provide the aforementioned unique fiber orientation the viscosity and temperature of the material through each phase of the process should be carefully controlled. First, the plastic mass supplied to the apparatus must be in a condition which is susceptible to counter-rotational diversion by the counter-rotating element. Then it must be capable of being influenced to substantially immediately set or freeze into a substantially rigid tubular structure. The transition from a plastic mass to a rigid structure must be capable of being fairly rapidly influenced in order to permit the twisting reaction which occurs during the transition from counter rotation to rigidity to form and preserve the unique helical orientation of the product of this invention. Application of tensional forces during the transition helps provide this orientation, particularly for linear molecular chain materials. Details of the control of temperature and viscosity throughout the extrusion process vary in accordance with the particular composition being used.

One illustrative method of control is to use a thermoplastic composition which is heated during extrusion to aid the frictional heating imparted by the screw feeding conveyor in maintaining the mass in a plastic workable condition as it passes through the counter rotating elements. The structure is then abruptly chilled into rigidity in the water bath, for example.

Another method of control is to use a thermosetting composition which is heated after extrusion to such an extent that the extruded form cross-links into a rigid structure as soon as it is extruded. Some heat may be added before and during passage of the composition through the counter-rotating elements, but care must be taken to maintain the temperature in the apparatus low enough to prevent a solid plug forming within the counter-rotating elements and jamming them. Lining the counter-rotating elements with a self-lubricating material, for example, Teflon helps prevent such jamming.

Another way of utilizing thermosetting materials is to extrude them at a temperature below the permanent setting temperature and then suddenly congealing it by cooling immediately after it leaves the counter-rotating elements. The congealed structure is then cured by any process which does not disturb the congealed orientation, for example, by age hardening at ordinary temperatures or by curing at temperatures just below the softening temperatures. The incorporation of special types of constituents in the thermosetting composition can facilitate this congealing and aging process, and these constituents are described in detail in the following sections.

EXAMPLES OF PRODUCTION METHOD APPLIED TO VARIOUS COMPOSITIONS

(1) Linear molecular chain compositions

Certain types of thermoplastic materials, such as polyamides, polyethylene and generally speaking, all linear polymers, have long chains of molecules "welded" together by molecular forces. These chains, for example, may be of the type illustrated on page 201 in the first edition of the book "Principles of High-Polymer Theory and Practise" by Alois X. Schmidt and Charles A. Marlies. Photomicrographs of polyethylene chains are also shown on page 57, and a scale model of a portion of a cellulose molecule is shown on page 56. These linear molecular chains are oriented as illustrated in Figs. 1–4, with fibers 17 being molecular chains within the plastic. Capstan 100 shown in Fig. 11 is particularly effective in helping orient such molecular chain type materials. The more amorphous plastic remains as binding material for the aligned molecular chains within the structure.

Suitable commercially available linear molecular chain materials are, for example, du Pont Zytel 42 nylon resin or polymeric amide, du Pont Alathon 4 and 5 polyethylene resins, and Dow Chemical Co. Styron 655 polystyrene.

(2) Fiber-reinforced thermoplastic

A thermoplastic material reinforced with fibers, such as the aforementioned types of polyethylene or polystyrene reinforced with glass fibers is mixed with suitable adhesion promoters to help provide a good bond between these fibers and the plastic material. Examples of useful adhesion promoters are organo-silicon compounds, commercially available, for example, from the Union Carbon and Carbide Company under the trade name A–1100. This compound is a silane type compound including reactive groups. Other silanes useful as adhesion promoters are: gamma-aminopropyltriethoxysilane and delta-aminobutyl-methyldiethoxysilane which are referred to as amino-modified silane esters and are also available from the Union Carbon and Carbide Co. These amino-modified silanes are also excellent for use with thermosetting epoxy resins which might also include either glass fibers or silica fillers.

Certain titanium esters, commercially available, for example, from the DuPont Co. are also good adhesion promoters. These titanium esters, for example, are tetra isopropyl titanate, tetra butyl titanate and tetra stearyl titanate which deposit a film of titanium oxide from a dry solvent solution by hydrolysis with atmospheric moisture. This film is hydrophobic and enhances the adhesion between dissimilar materials.

All of these aforementioned adhesion promoters are surface active which helps promote a uniform dispersion of the short fibers in the resinous binder mixture.

A mixture of ¼ inch long glass fibers, for example, and thermoplastic material is put under pressure and heated into a flowable condition by means of a ram or a screw-type of extrusion machine. This mixture may, for example, include as much as 10 to 30% by volume of glass fiber. The viscous mixture is then passed through the counter-rotating force-applying means, and the extruded structure is cooled rapidly after forming. The thermoplastic material then has the desired fiber orientation. Postforming of this structure into any desired shape can be accomplished by heating the material again, or it may be done just after the material is formed and before it is entirely cooled down to rigid structure.

(3) Fiber-reinforced thermosetting

Thermosetting types of binding materials generally produce stronger structures than do thermoplastic materials. This is naturally accentuated in structures to be used at elevated temperatures because the thermoplastic materials tend to soften and thereby lose strength, while the cross-linking between the polymeric chains of molecules in the thermosetting materials is firmly welded together by permanent and irreversible forces regardless of temperature. Examples of usable thermosetting materials are: polyesters, such as a urea or melamine aldehyde, which are widely used in the glass fiber reinforced industry; phenolic type materials, such as phenol-formaldehyde and phenol furfural; and the more recently discovered epoxy resins which are obtained from the combination reaction between epichlorihydrin and bisphenol-A.

Most commercial epoxy resins used in the U.S. and Europe are based on epichlorohydrin and the difunctional phenol bisphenol-A. Each commercial resin is a particular mixture of molecules of varying molecular weight with about two epoxy groups per molecule. The higher molecular weight resins are solids, and the lower ones are liquids of relative high viscosity. Reactive diluents of a very low viscosity with one epoxy group such as butyl glycidyl ether or phenyl glycidyl ether are often incorporated in small amounts such as 10%. The physical properties of the cured resins are not affected greatly thereby because this diluent copolymerizes into the structure, but these diluents provide a much less viscous material which facilitates intermixing of the curing agent and handling of the mixture. The epoxy group or ring is characterized by a bond between oxygen and a $CH_2$ and $CH$ group bonded to the molecule at its ends, as follows hydride. Chlorendic anhydride made by the Hooker Chemical Co. under the name Het anhydride may also be used in conjunction with equal parts of epoxy resin.

These thermosetting types of compositions may be mixed in varying proportions and subjected to a method of this invention to align the incorporated fibers in the unique orientation of this invention. The proportions of constituents are varied to provide good flow and orienting properties during passage through counter-rotating elements and high susceptibility to immediate hardening or setting immediately after discharge from the counter-rotating elements. When heat applied at high temperatures is used to immediately set the extruded structure, conventional types of the aforementioned thermosetting binding materials may be utilized.

When dielectric heating, for example, is used to cure the resin in extensions of the counter-rotating elements, compositions including the following constituents may be utilized. The preferred curing temperature for an epoxy resin-anhydride composition is between 100 and 200°C. in these extensions, and the preferred operating temperature of the extruder barrel, screw and counter rotating elements is below 100°C. (from 80° to 110° in the direction of travel).

| Examples | Parts by weight of curing agent per 100 parts by weight of resin | State | Curing Temp., °F. |
| --- | --- | --- | --- |
| Metaphenylenediamine | 12 to 16 | Solid | 150–300 |
| Diethylaminopropylamine | 4 to 8 | liquid | 80–240 |
| Diaminophenylsulfone | 28 to 30 | solid | 240–400 |
| Dicyandiamide | 3.5 to 4.5 | ----do---- | 300–350 |
| Chlorendic anhydride | 90 to 110 | ----do---- | 250–360 |
| Hexahydrophthalic Anhydride | 75 to 85 | ----do---- | 210–400 |
| Mixture of Pyromellitic and Maleic Anhydrides. | { 13 to 21<br>{ 19 to 27 | ----do----<br>----do---- | 320<br>320 |
| Phthalic Anhydride | 40 to 50 | ----do---- | 210–400 |
| Dodecenyl Succinic Anhydride. | 120 to 150 | liquid | 120–250 |

However, a unique type of thermosetting composition may be also utilized which is preliminarily set or congealed by cooling and which includes constituents which permit the structure to be permanently cross-linked at elevated temperatures without disturbing the congealed orientation.

This type of composition may be a thermosetting composition having an extended shelf life at relatively low temperatures or unusual properties may be imparted to a thermosetting composition including a high temperature These epoxy resins are polymeric materials which together with suitable agents such amines or anhydrides are capable of hardening by polymerization and cross-linking into rigid and infusible masses with exceptional adhesive power to such surfaces as glass or metals. This adhesion of epoxy to glass fiber may chemically be further enhanced by the use of any of the aforementioned adhesion promoters, such as A-1100. Some of these adhesion promoters may be conveniently applied in water-emulsion form to the glass fibers, before the fibers are mixed with the epoxy resins and the hardeners. Commercially available epoxy resins are, for example, Epiphen 845 made by the Borden Co., or Epon 828 made by the Shell Co. A suitable hardening or cross-linking agent, for example, is 30 parts of diaminodiphenylsulfone with 1 part of boron trifluoride complex ($BF_3$–400) with each 100 parts of Epon 828. Another suitable hardening agent is, for example, pyromellitic dianhydride mixed with maleic ancuring agent by adding to it a low temperature gelling agent with low temperature steric hindrance to permit the composition to set to a thermoplastic hardened mass at ordinary temperatures and even gradually raise the softening temperatures as heat is applied at temperatures just below these rising softening temperatures to more permanently crosslink the structure. This low temperature gelling agent also enhances the shelf life of the extrudable composition by preventing the high temperature curing agent from slowly crosslinking at relatively low temperatures.

A suitable low temperature curing aid or gelling agent is a polyamide, for example, Versamid 125, made by General Mills, Inc. It is prepared, for example, by the condensation of a polymerized unsaturated fatty acid (e.g. dilinoleic acid) with aliphatic amines such as ethylene diamine. The preferred range of polyamide addition is from 3–10 parts by weight of polyamide per 100 parts by weight of epoxy resin. If too much polyamide is added, the mixture becomes too soft at elevated postcuring temperatures.

Versamid 125 is a highly viscous liquid at room temperature. It is the lowest molecular weight and most reactive of several types of Versamids produced by General Mills, Inc. All these polyamides (of different degrees of polymerization) are made from fatty acids such as linoleic acid by using an excess of amines, so that the polymer contains linoleic acid groups, amid groups and also reactive amine groups. It is pretty well recognized that these amine groups open up the epoxy rings in the epoxy resin and trigger the polymerization of the two compounds together into an infusible crosslinked structure. Epoxy resins can be cured with relative large amounts (50/50) of such polyamides, even at room temperature, but with somewhat improved properties with a higher postcure. It might, therefore, be expected that Versamid 125, similar to other amines, would be an ordinary curing agent for epoxy resin through a process of polymerization.

It is also known that anhydrides such as chlorendic anhydride, which is a dicarboxylic anhydride (1,4,5,6,7,7-hexachlorobicyclo-(2.2.1)-5-heptene-2,3-dicarboxylic anhydride or also known as hexachloroendomethylene-tetrahydrophthalic anhydride) will react with and cure and harden epoxy resins. This class of organic polycarboxylic anhydrides as hardeners for epoxy resins is described in U.S. Patent 2,324,483.

The Versamid, when used alone with the epoxy resin, in small amount such as 5% by weight, thickens the epoxy resin from 10,000 centipoise and up to several hundred thousand centipoise by polymerization. Then apparently the reaction stops (even if heat is applied), so there is some indication that the available amine groups have been used up.

Similarly, a small amount of chlorendic anhydride of 10% dissolves in the resin and gradually thickens it. While 100 parts of chlorendic per 100 parts of resin behaves similarly and in a much more pronounced fashion, this larger amount gradually over a period of time hardens the resin to an infusible mass even at room temperature, which upon heating will not melt again. It is, therefore, amazing that the addition of about 5% by weight of Versamid to 100 parts by weight of resin and 100 parts by weight of anhydride inhibits the crosslinking reaction of the anhydride and produces a solid compound which is meltable over a long period of time, for example, six months.

This solid compound upon melting at a relatively low temperature of 75° C. has a liquid life of twenty minutes; and at a higher temperature of about 100° C., it has as much as 10 minutes of liquid life, before it crosslinks further to become rubbery and tough. After melting this compound at below 100° C. in the extruder, it is then possible to raise the temperature immediately in the orifice or thereafter to 180° C. whereupon hardening sets in very rapidly.

Certain complex amines which require a high temperature to cure the resin, when used in small amounts have the same effect as the Versamid. For instance, alpha methyl benzyl dimethyl amine gives a fairly good life when used in amounts of from 1.5 to 2.5 parts by weight per 100 parts by weight of epoxy with chlorendic anhydride in the amount of 100 parts, per 100 parts by weight of resin.

Fibrous materials, for example, glass fibers, are added to the composition in the range of 10-30% by volume of the entire composition.

Fillers can also be added in the range of from 1-2 parts by weight of filler to one part of thermosetting constituent. A useful filler, for example, is silica of fine particle size; or other fillers of extremely fine particle size such as silica gel, bentone or any similar inert material such as carbon black (in the range of from 2 to 3% by weight) may be used. These fillers tend to aid in producing a flowable structure which facilitates passage through the counter-rotating elements; and they, therefore, help promote uniform distribution of the fibers throughout the structure which strengthens the resultant product.

An example of an effective composition of this type and its method of preparation and extrusion is set forth in the following. The starting composition, for example, is mixed in the following sequence:

(1) 100 pounds Epiphen 845
(2) 5 pounds Versamid 125
(3) 100 pounds silica filler
(4) 40 pounds silica gel filler
(5) 150 pounds ¼ inch-long glass fibers, coated with A-1100
(6) 100 pounds Het anhydride The Versamid is first stirred well into the epoxy resin before the other ingredients are added. It is used shortly after preparation, as the Versamid tends to thicken the mixture slowly even at room temperatures. It is then supplied at relatively low temperatures to the counter-rotating elements. After it leaves the counter-rotating elements, it is immediately cooled to set it with sufficient rigidity to allow the extruded form to maintain its shape. The gelling agent then gradually raises the melting temperature under a postcure at slowly rising temperatures, for example, from 50° C. to 100° C.

The aforedescribed composition facilitates the problem of storage and feeding to an extruding apparatus as described in the following. Glass fibers, for example, are coated with a liquid resin mix, and then allowed to slowly harden into a solid mass, preferably in the shape of small rods. These rods are subsequently chopped into pellets suitable for dry feeding to the extruder. In the extruder, these pellets are reheated and melted to produce the flowable mass which is required for production of the novel structure of this invention.

Certain combinations of known curing agents and resins will sometimes accomplish somewhat the same result as outlined above for limited periods of time. For example, an epoxy resin combined with dicyandiamide, for example, is known to have shelf life of up to a year when deposited on glass fiber material, for example, by means of the acetone or any other solvent method, for example, the method commercially used for preparing fiber-reinforced plastic materials.

(4) *Other compositions*

Mixtures of many other various types and lengths of fibers may also be used. Asbestos fibers and cellulose fibers are both inexpensive and readily available commercially. An interesting variation in filler is ordinary Portland cement which has the unique property of being capable of hardening when exposed to moisture. Thus, it is possible to improve the wet strength of the structure, simply by immersing it in water for some time, whereby water molecules diffuse into the structure and harden the filler.

What is claimed is:

1. An extruded form comprising fibers interspersed within a matrix of binding material, said fibers being angularly oriented in opposite and substantially equal directions to the principal direction of extrusion in outer regions of said form to a substantial depth into the interior of said form with a gradual transition from one of said angular orientations to the other through the interior of said form.

2. An extruded form as set forth in claim 1 wherein said form is tubular with said fibers adjacent the outer and inner surfaces of said tube respectively helically oriented in opposite directions.

3. An extruded form as set forth in claim 2 wherein said fibers are substantially oriented in said principal direction of extrusion within said interior.

4. A form as set forth in claim 1 wherein said fibers are comprised of linear molecular chains of said binding material.

5. A form as set forth in claim 1 wherein said binder is a plastic material.

6. A method of extruding a composition having felted fibers disposed within the mass of said composition, said method comprising the steps of longitudinally feeding a flowing tubular mass of said composition, in the principal longitudinal direction of extrusion, orienting the fibers in said flowing tubular mass of said composition into opposite helical directions in inside and outside regions of said mass, said fiber orientation being brought about by the application of forces applied a substantial distance into and within the inside and outside surfaces of said tubular mass, said forces being counter-rotational relative to each other and to said tubular mass and being applied in substantially equal and opposite directions from said inside and outside surfaces of said flowable tubular mass to react with said mass to angularly orient portions of said mass and said included fibers in opposite and substantially equal directions to the axis of said tubular mass in said inside and outside regions of said tubular mass with a felted and not abrupt transition from one of said angular orientations to the other through the interior of the wall of said tubular mass, and influencing said oriented tubular mass to set by exchanging heat with a surface of said tubular mass.

7. A method as set forth in claim 6 wherein the overall cross section of the tubular mass is compacted and smoothed as said counter-rotational forces are released.

8. A method as set forth in claim 7 wherein said inside and outside surfaces of the tubular mass are smoothed and maintained in sliding contact with smoothing surfaces until sufficient heat has been exchanged to set said surfaces to a permanently smooth condition for preventing any subsequent roughening caused by any embedded fibers springing out through said inner and outer surfaces.

9. A method as set forth in claim 6 wherein tensional force is exerted upon said form as it is setting.

10. A method as set forth in claim 6 wherein said mass has thermoplastic properties, and it is influenced to abruptly set by sudden cooling.

11. A method as set forth in claim 6 wherein said mass has thermosetting characteristics, and it is influenced to set by applying heat after application of said counter-rotating forces.

12. A method as set forth in claim 6 wherein a thermosetting mass including a high temperature curing constituent is fed, the temperature of said mass being maintained below the thermosetting temperature and above its freezing temperature during application of said counter-rotational forces, said mass being abruptly cooled to set it into said substantially rigid form, and said form being cured at a temperature below its melting temperature to permanently harden it without disturbing said orientation.

13. A method as set forth in claim 12 wherein said mass includes fibers and said thermosetting binder, said fibers being preliminarily coated with said thermosetting composition and slowly hardened at relatively low temperatures, said hardened mass being chopped up into pellets which are heated as they are fed to provide said tubular flowable mass.

14. A method as set forth in claim 13 wherein said form is postcured at temperatures which gradually rise and are maintained below the gradually rising softening temperatures of the crosslinking extruded form.

15. A method as set forth in claim 6 wherein heat is exchanged substantially at equal rates with the inside and outside of said tubular material.

16. An apparatus for extruding a composition susceptible of fiber orientation into a form having predetermined fiber orientation comprising a feeding means for supplying a tubular mass of said material, a counter-rotating force-applying means including vaned concentric elements which rotate in opposite directions relative to said form and forming therebetween an annular channel through which said composition is fed longitudinally, a heat exchange means disposed in heat transfer relationship with a surface of the extruded form a predetermined distance beyond said counter-rotating elements to substantially immediately set said mass into a rigid form, and said predetermined distance being sufficient to permit said counter-rotating elements to angularly orient portions of said mass in outer and inner portions of the wall of said mass in substantially opposite and equal direction to the principal direction of extrusion.

17. An apparatus as set forth in claim 16 wherein said counter-rotating elements include vaned sleeves and smooth surfaced continuations of said counter-rotating vaned sleeves are provided to smooth the inner and outer surfaces of said mass after passage through said vaned sleeves.

18. An apparatus as set forth in claim 17 wherein said continuations are maintained sufficiently short to prevent interference with said fiber orientation.

19. An apparatus as set forth in claim 18 wherein said continuations converge to provide a relatively narrow annular exit throat which smooths and compacts the overall cross section of said oriented tubular mass.

20. An apparatus as set forth in claim 17 wherein said counter-rotating elements include pockets formed between said vanes, and said continuations initiate from the roots of said pockets.

21. An apparatus as set forth in claim 20 wherein said vaned sleeves are of sufficient length relative to the width of the pockets formed therebetween to orient fibers passing therethrough in a direction parallel to said vanes.

22. An apparatus as set forth in claim 20 wherein said vanes are longitudinally disposed.

23. An apparatus as set forth in claim 16 wherein frictional drag means are operatively engaged with said form as it is discharged from said counter-rotating elements, pulling means for exerting a tensional force upon said rigid form being engaged with said form after it leaves said drag means, and the force of said pulling means being substantially equal to the drag exerted by frictional means to exert a tensional force upon said form as it is hardening.

24. An apparatus as set forth in claim 23 wherein said frictional drag means are comprised of smooth extensions of said counter-rotating elements which provide a smooth tapering annular passage therebetween for said tubular mass.

25. An apparatus as set forth in claim 24 wherein heat exchange means are associated with said extensions.

26. An apparatus as set forth in claim 16 wherein said heat exchange means is disposed in heat transfer relationship with the inside and outside surfaces of said tubular mass.

References Cited in the file of this patent

UNITED STATES PATENTS

| | | |
|---|---|---|
| 2,046,541 | Becker | July 7, 1936 |
| 2,115,607 | Becker | Apr. 26, 1938 |
| 2,461,630 | Cozzo | Feb. 15, 1949 |
| 2,519,375 | Jargstorff | Aug. 22, 1950 |
| 2,676,356 | Becker | Apr. 27, 1954 |
| 2,720,680 | Gerow | Oct. 18, 1955 |